United States Patent [19]
Christopher

[11] Patent Number: 6,037,571
[45] Date of Patent: Mar. 14, 2000

[54] DUAL POWER HIGH HEAT ELECTRIC GRILL

[76] Inventor: Nicholas S. Christopher, 20 N. Main St., Sherborn, Mass. 01770

[21] Appl. No.: 09/094,990

[22] Filed: Jun. 15, 1998

Related U.S. Application Data

[60] Provisional application No. 60/053,235, Jul. 21, 1997.

[51] Int. Cl.⁷ .............................. H05B 3/68; B23K 13/08; H02J 1/10; H02J 3/02
[52] U.S. Cl. ...................... 219/450.1; 219/482; 307/18; 307/21; 307/22
[58] Field of Search ................... 219/450.1, 524, 219/525, 532, 536, 537, 541, 482, 483; 99/451, 401, 402, 422; 307/18, 19, 21, 22, 25, 26, 29

[56] References Cited

U.S. PATENT DOCUMENTS

| | | | |
|---|---|---|---|
| 3,327,198 | 6/1967 | Rauch | 307/29 |
| 3,555,395 | 1/1971 | Beery | 307/29 |
| 3,582,669 | 6/1971 | Dempsey | 307/18 |
| 3,848,110 | 11/1974 | Giguere et al. | 219/525 |
| 3,991,320 | 11/1976 | Ross | 307/71 |
| 5,025,130 | 6/1991 | Slone | 219/203 |
| 5,045,712 | 9/1991 | Baggenstoss | 307/29 |
| 5,160,852 | 11/1992 | Charles | 307/77 |
| 5,171,973 | 12/1992 | Higgins | 219/464 |
| 5,302,857 | 4/1994 | Charles | 307/20 |
| 5,524,528 | 6/1996 | Yeh | 99/446 |
| 5,578,230 | 11/1996 | Eldon | 219/211 |
| 5,606,245 | 2/1997 | Kirby | 307/29 |

*Primary Examiner*—Sang Paik

[57] ABSTRACT

The invention is a dual power source high heat electrical grill whose primary application is as an outdoor or indoor grill which uses the combination of AC and DC powered elements in a hybrid configuration to produce as much heat as conventional outdoor gas grills and more than could otherwise be produced by a conventional electric grill.

19 Claims, 5 Drawing Sheets

FIGURE 3

| Application | Family Size | Typical Dimensions | Cooking Surface | Number Of Batteries | Voltage | Number Of DC Heating Elements | Wattage Per Element | Current Per Element | Total DC Watts | AC Heating Element Wattage | Total Grill Wattage | Total Grill Btu's | Btu's Per Sq. Inch |
|---|---|---|---|---|---|---|---|---|---|---|---|---|---|
| Condo Balcony | Small | 10"x17" | 170 Sq In | 1 | 12VDC | 4 | 225W | 18.75A | 900W | 1800W | 2700W | 9212 | 54 |
| Single Family Home | Larger Family | 10.5"x21.5" | 225 Sq In | 2 | 24VDC | 4 | 450W | 18.75A | 1800W | 1800W | 3600W | 12,283 | 55 |
| Single Family Home | Family & Guests | 11"x27.3" | 300 Sq In | 3 | 36VDC | 4 | 675W | 18.75A | 2700W | 1800W | 4500W | 15,354 | 51 |
| Single Family Home | Party Size | 13.4"x30" | 400 Sq In | 4 | 48VDC | 4 | 900W | 18.75A | 3600W | 1800W | 5400W | 18,424 | 46 |

DUAL POWER HIGH HEAT ELECTRIC GRILL

This application claims benefit of Provisional Application No. 60/058,235 filed Jul. 21, 1997.

FIELD OF INVENTION

The present invention is directed to a dual power electric grill which uses the combination of AC and DC powered elements to produce high heat.

BACKGROUND OF THE INVENTION

Approximately 10 million grills are sold annually in the United States. Almost all of these are either gas or charcoal. Less than 3% are electric. The drawback of electric grills heretofore has been limited maximum heating capacity set by standard load limits to household electrical circuits of 15 amperes. Although there are some higher current circuits in newer construction, for safety reasons, manufacturers and/or safety regulators, such as like Underwriter's Laboratories, limit the power draw to 1800 watts.

Charcoal grills have a number of drawbacks. They use dirty charcoal, are difficult to light, take a long time to reach optimal temperature and are messy to clean.

Gas grills do not suffer from any of the foregoing drawbacks of the charcoal grills and are gaining in popularity. They can easily produce an equivalent of over 3600 watts of heat. However, gas grills can be dangerous if not handled properly. In fact, gas grills cause more than 5000 burning or explosion accidents each year. Furthermore, they cannot be used on apartment or multi-family balconies, and one should not store them in an enclosed area like a garage, basement or enclosed porch. The gas used is highly pressurized and is potentially dangerous.

One approach to providing higher power to heating and other such portable appliances is to connect two separate circuits together such as taught in the patents of Charles (U.S. Pat. Nos. 5,302,857 and 5,160,852); Dempsey (U.S. Pat. No. 3,582,669); and Ross (U.S. Pat. No. 3,991,320) each incorporated herein by reference.

Another approach using separate elements to provide different levels of heating in a heater is taught by among others Higgins in U.S. Pat. No. 5,171,973. Higgins uses both 120 volt and 240 volt circuits to accomplish his goal of providing users with a variety of levels of heating. He also suggests use of an infra-red lamp as one of the heating elements, although he acknowledges the additional cost factor in doing so.

There are a number of electric grills of varying designs. An example of a conventional electric grill is in U.S. Pat. No. 5,524,528, Jun. 11, 1996, Class 99/446 issued to Y. Yeh incorporated herein by reference. The principal features claimed are a plurality of strips formed to define oil-leading channels and vent holes on the side wall of the seat of the griller.

These and other approaches do not offer the same advantages as the present invention.

SUMMARY OF THE INVENTION

It is an object of the present invention to provide a dual power electric grill which uses combined AC and DC powered elements to produce high heat for grilling meat, fish and other food quickly and thoroughly.

A further object of the dual powered grill invention is to provide an electrical grill which provides high heat levels and cooking times comparable to a gas grill.

Yet another object of the invention is to provide a safe high heat alternative to high heat gas grills which can be used outdoors, on apartment balconies, in a garage, on a porch or even indoors.

Yet another object of the invention is to provide a means for powering up or boosting the heat for short periods whenever intense heat is required, such as for sizzling steaks.

Yet another object of the invention is to provide two or more heating elements, a high heating area which is relatively uniform and a heating area of lesser heat which is also relatively uniform.

These and other objects of the present invention will become more readily appreciated and understood from a consideration of the following detailed description of the preferred embodiments when taken together with the accompanying drawings.

BRIEF DESCRIPTION OF THE DRAWINGS

FIG. 3 is a table of examples of different sized grills.

DETAILED DESCRIPTION OF THE PREFERRED EMBODIMENT

The present dual power high heat electric grill produces twice as much heat as other electric grills without requiring the use of high voltage (240 volt) circuits. This is accomplished by using two different power sources, an AC source and a DC battery source in a hybrid configuration. The AC source is the normal household electrical wall outlet in the United States which accepts power from the distribution grid through step-down transformers delivering 120V, 60 Hertz, AC current (or comparable in countries outside the United States). Houses, apartments and other buildings are typically provided with a power distribution panel which divides household service into separate circuits, each being fused (or having circuit breakers) at 15–20 amperes. A 15 ampere circuit can safely deliver 1800 watts of AC power. By using the same circuit to charge batteries when the grill is not in use, one can store enough energy to obtain an additional 1800 watts of D.C. power from these batteries when needed for grilling.

Figure 1:
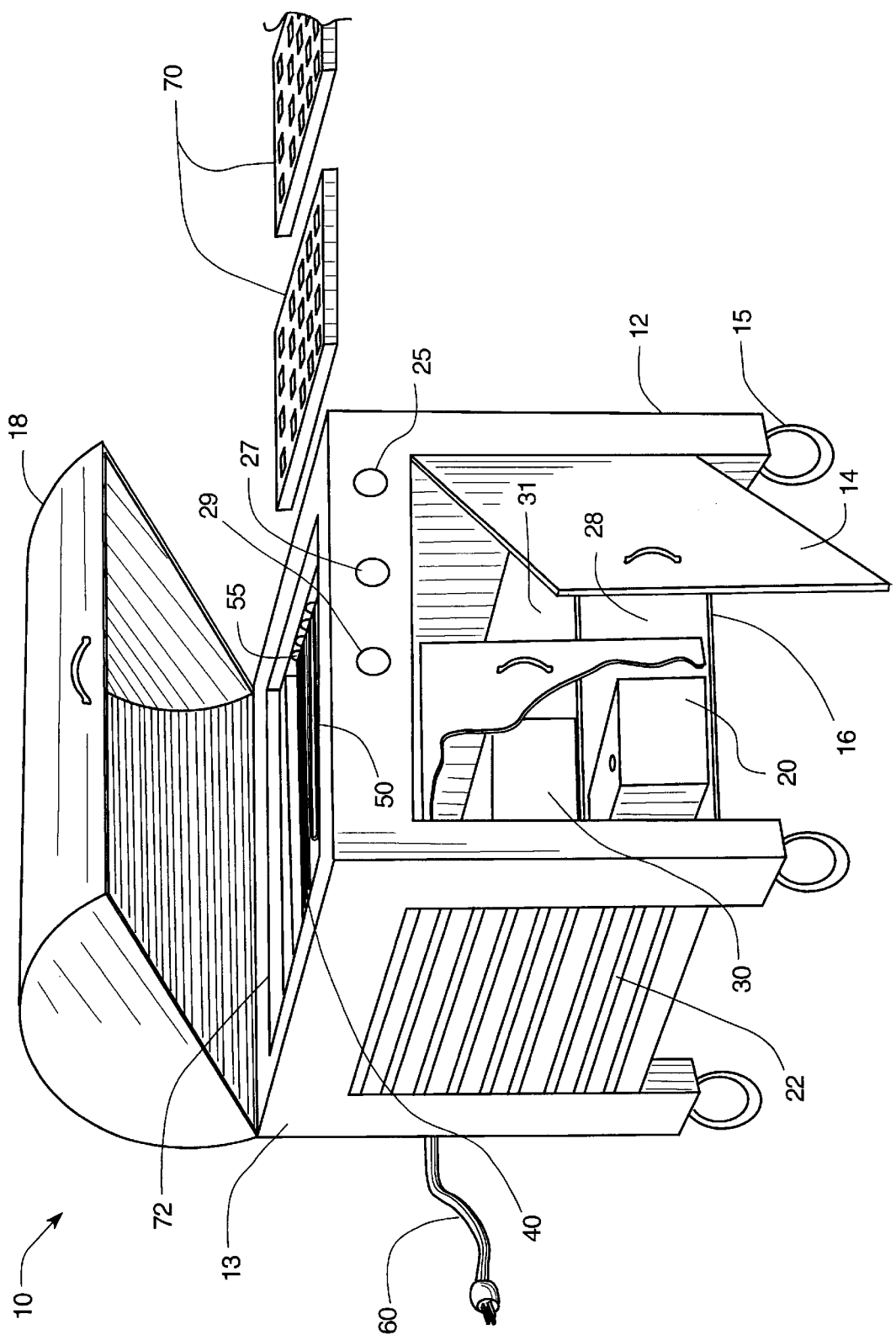
FIG. 1 is a perspective cut-away view of the device as a cooking grill.

In FIG. 1, a perspective, partially exploded, partially cutaway view is seen of the hybrid dual power electric grill 10. A battery or batteries 20 are located in a housing 16 below the grill area in a space which otherwise might be occupied by a propane tank on a gas grill. The housing 16 is formed in part within a rectangular frame 13 which has four legs 12 terminating at the bottom in castors 15. A battery charger 30 is located on a shelf 31 above the battery or batteries 20. The charger is wired so it automatically recharges the batteries whenever the grill is turned off. Sizing of the batteries is based on using two standard 12 volt marine type deep cycle batteries wired in series and rated at 75 ampere hours. Such batteries will energize the 24 volt, 1800 watt grill for one hour. As most grills are operated for 45 minutes or less, the battery is conservatively rated. The battery charging component is designed so that within 24 hours, the grill may be used again. In the preferred embodiment this is done automatically. Commercial battery chargers, which may be fully automatic, typically use a step-down transformer to feed four diodes in a full wave rectifier configuration to convert AC to DC and may also use a capacitor for smoothing the output along with a diode by-pass to prevent over-charging.

An added optional feature of the preferred embodiment is an automatic timer (not shown) which turns the grill off after one hour of operation as a safety precaution and to protect the battery from being overly discharged. This feature could be integrated into the main power switch. Another option to accomplish the same purpose is a commercially available low battery voltage disconnect box (not shown). Yet another option would be a key electrical switch (not shown) to prevent children from accidently activating the grill.

A side panel 22 has louvers or slots for ventilation for the batteries and charger. A rear or front door 14 of the housing 16 may be lockable for security. Wheels 15 on the legs 12 of the frame 13 are preferably over-sized for ease of movement since the cart comprised of the housing 16, frame 13, upper 31 and lower 28 shelves and associated supporting hardware may be heavier than a gas grill.

Power cord 60 is a conventional three-wire insulated power cord where the third wire is ground. Control switch 25 is the main power switch for the AC power. When it is in the "ON" position, the charging circuit is disabled and the AC and DC heating element circuits are enabled. When it is in the "OFF" position, the charging circuit is enabled and the AC and DC heating element circuits are disabled. Two additional variable controls 27 and 29 enable one to select between AC heaters only ON, DC heaters only ON or both AC and DC heaters ON. Other components include a cover 18, a lip 72 to hold food racks 70, "back burner" DC heating elements 40 and "front burner" AC heating elements 50. The DC heating elements are connected in parallel between two bus bars located at the back of the grill. The bus bars may also be located along the front of the grill.

The mechanical design of the housing 13, lip 72, food racks 70 and heating elements 40 and 50 is such that especially high heat can be applied close to the food being cooked so that for example meat can be seared for a brief period of time to hold in the juices. This gives results preferred by many who like juicier meat. This is accomplished by having the elements in close proximity to the food rack. For example elements may be as close as 0.5 inch below the food rack and may produce a surface temperature of up to 1100 degrees F. An additional benefit of having heating elements close to the food is that the grill cover can be opened frequently to check on progress in cooking the food without materially affecting the cooking cycle.

Additional features of the grill housing 13 and frame 16 are that the battery and charger support shelves are below the AC and DC electrical heating elements so their weight lowers the center of gravity of said grill. Furthermore, maximum separation of the batteries from grill heat is provided.

Figure 2:
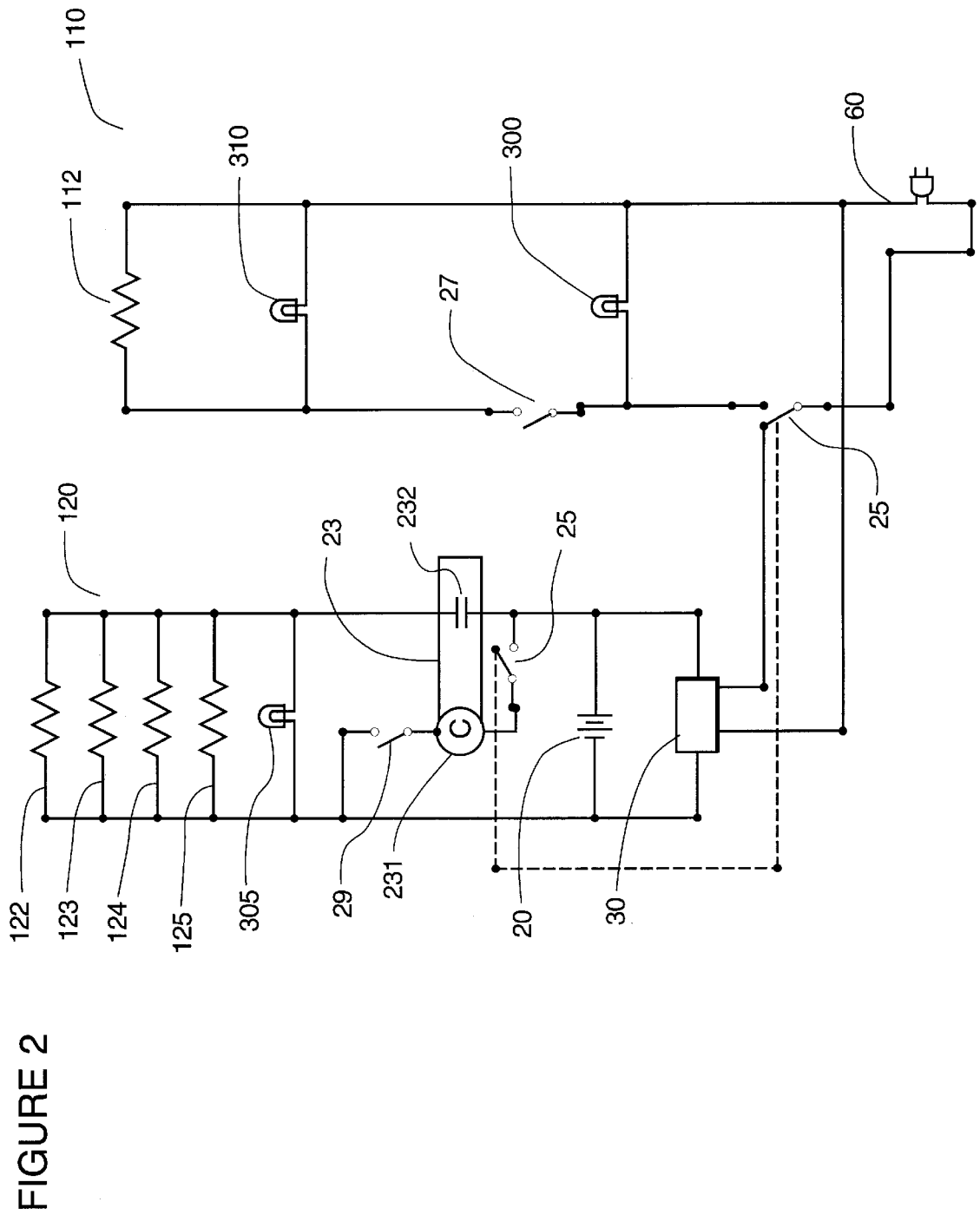
FIG. 2 is an electrical circuit schematic of the device.

FIG. 2 is an electrical schematic of the electric grill which illustrates the AC 110 and DC 120 heating elements. It also shows that the DC heating elements may be sub-divided into four 450 watt sections 122, 123, 124 and 125 wired in parallel. This reduces the current flowing through each DC heating element by three quarters as compared to a single 1800 watt, 24 volt DC heating element thereby allowing use of more practical and reasonably sized DC heating elements. Increasing or decreasing the number of DC heating elements will increase or decrease the amount of heat contributed to the overall grill heat. For example, for a smaller grill of 170 square inches (a grill that is 10"×17"), two 450 watt DC heating elements in conjunction with the 1800 watt AC heating element will provide a total of 2700 watts. A switch for the DC elements 29 and a switch for AC element 27 are indicated as separate, however, they may be activated from a common dual control switch (not shown).

Furthermore, the addition of an infinitely variable control such as a rheostat, a solid state pulse width modulation controller or silicon controlled rectifier controller to regulate heat level may be desired. For example switches 27 and 29 may be a control with on-off-variable positions. Alternatively step switches may be used which would regulate the number of heating elements activated to control the level of heat (as in FIG. 5).

A main power switch 25, is also indicated corresponding to the location indicated in FIG. 1. Switch 25 is shown as a double pull, double throw switch. One side of the switch 25 controls AC input and the other side 26 controls energization of the DC heating coils. This main power switch 25 disengages AC as well as DC heating circuits when it is turned "OFF". As explained above, when it is in the "ON" position, the charging circuit is disabled. When it is in the "OFF" position, the charging circuit is enabled and the AC as well as the DC heating elements are disabled. A grounded power cord 60 running to a 120 volt AC outlet is indicated in FIGS. 1 and 2.

Switching the high current available from fully charged batteries is done using a contactor 23 comprised of heavy duty contacts 232 and a coil 231 which when activated by switch 25 and 29 being both closed, closes the high current contacts to energize the DC heating elements 120.

While the DC heating elements are shown as all connected in parallel and all activated upon closure of switches 25 and 29, in actuality, the activation of the individual elements may be done selectively using a multiple position rotary switch (as in FIG. 5) or an infinitely variable control such as a variable resistance rheostat or a solid state device.

Battery(s) 20 are connected to a battery charger 30 as indicated. In the preferred embodiment, battery charger 30 provides a charging rate appropriate for the type of battery (lead-acid in this instance); namely, a relatively slow charge initially followed by a float charge to maintain full charge without overcharging. One form of overcharge protection is a diode having a specific voltage cut-off near the rated battery voltage (12 or 24 volts for example) so that when voltage reaches this level the diode ceases to conduct.

While the battery of FIG. 2 is indicated as a single unit, it could in fact be multiple batteries in series or parallel. In the preferred embodiment shown two 12 volt batteries are used in series.

Three indicator lamps are shown. The main power indicator lamp 300 is selected to be green in this instance and the indicator lamp 310 for AC elements energized and indicator lamp 305 for DC elements energized are both yellow. Color selection is arbitrary.

FIG. 3 provides a table illustrating various combinations of size and wattage options available in different configurations. While options illustrated are based on the number of 12 volt batteries used (one to four), one could just as well use individual batteries of lower or higher voltage. The dual power source approach allows virtually any size grill to be constructed—ranging in capacity from approximately 2400 watts (8188 BTUs) to over 34,560 watts (118,000 BTUs). For example, assuming a recharge period of 24 hours and 1800 watts available from a 15 ampere electrical wall outlet and an efficiency of 80% for the battery charger, the charging system can deliver 34,560 watts of DC power to a battery bank which in turn can deliver this much energy over many different time periods. As examples one could deliver 34,560 watts in one hour or 17,280 watts in two hours.

Figure 4:
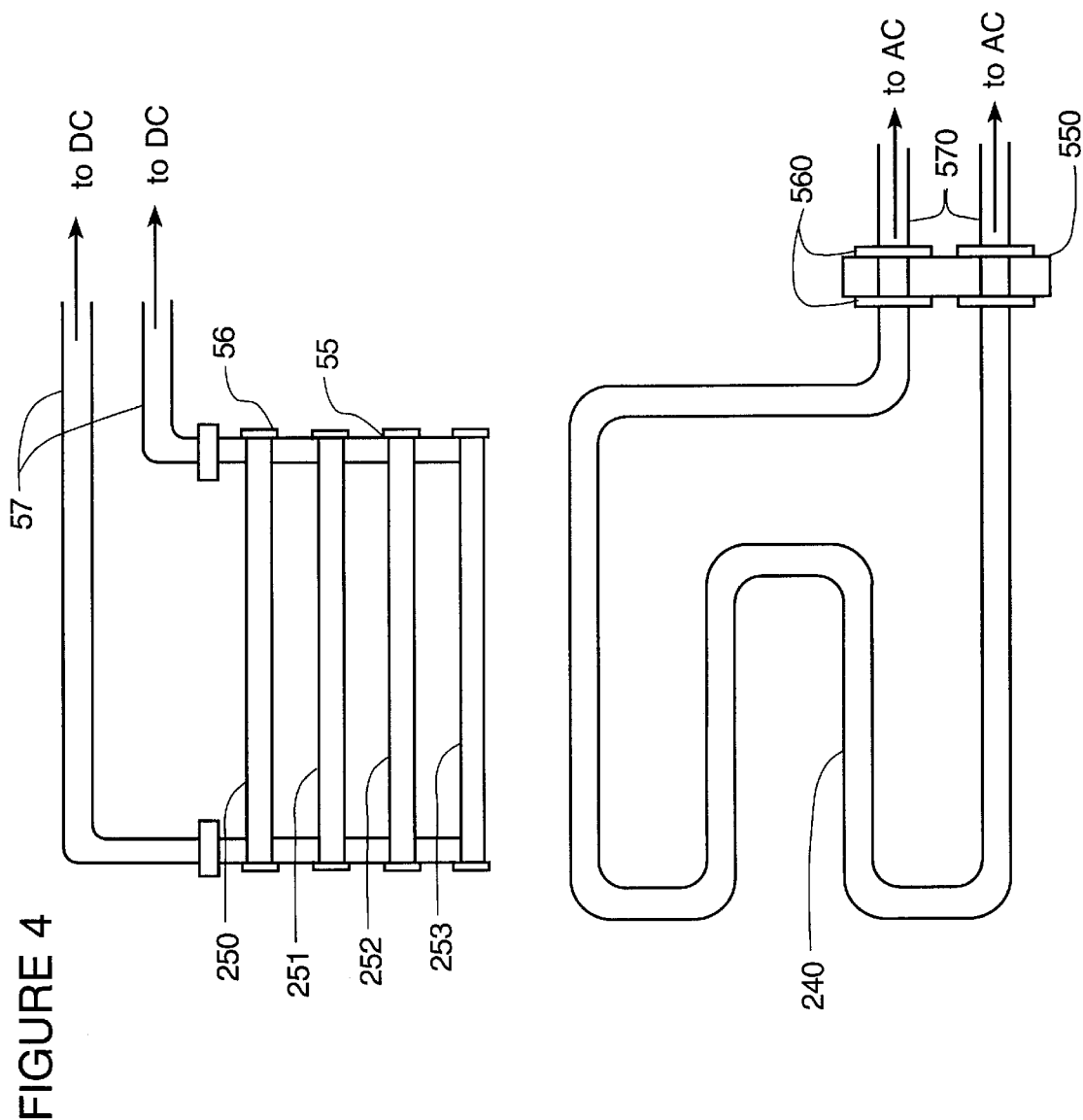
FIG. 4 is a plan view of heating elements in the preferred embodiment.

FIG. 4 is a plan view of the preferred arrangement of heating elements. In this embodiment the AC heating element 240 is comprised of a single resistive element and the four DC heating elements 250, 251, 252 and 253 are connected in parallel. Other combinations of and shapes of heating elements are readily available. The DC heating elements are connected to a pair of bus bars 55 on either end of the grill using locking nuts 56. Conductors 57 lead away to switches and DC power. The conductors from individual elements may be combined to provide a single contact which in turn may be regulated using an infinitely variable control such as a rheostat or electronic controllers; or may go to different poles of a multiple pole switch to provide different levels of heat depending on which combinations of elements are energized (see FIG. 5).

The AC heating element is similarly connected to a mounting bracket 550 and secured with locking nuts 560. Electrical conductors 570 are attached to each end of the AC heating element and lead to the AC power switch (which may be a simple contact closure or a controller providing variable power) and in turn to the AC power cord.

Figure 5:
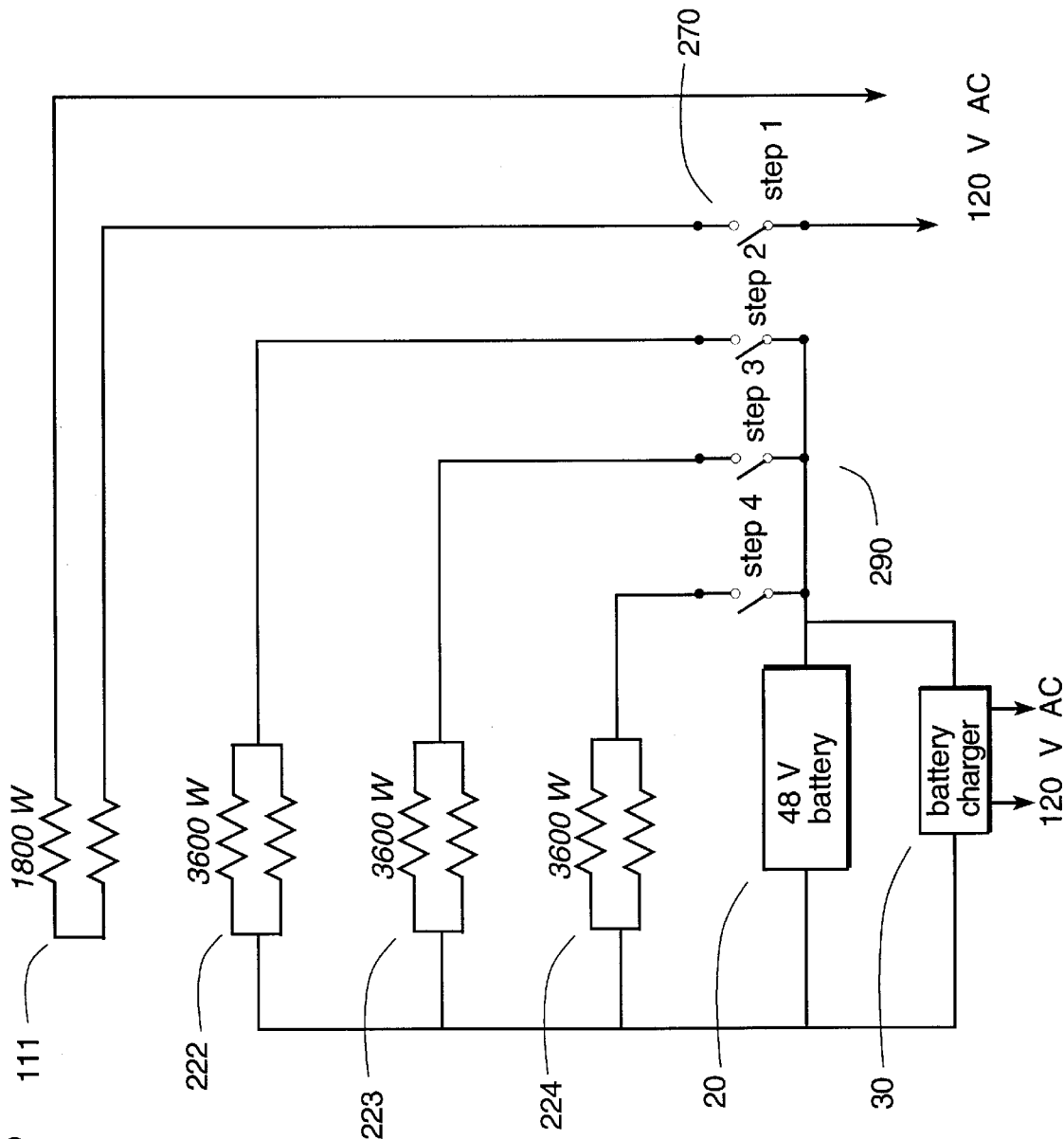
FIG. 5 is an electrical schematic of one embodiment having switchable heat levels.

FIG. 5 is an electrical schematic of one embodiment having several switchable heat levels as referred to above. AC heating element 111 is energized upon closure of switch 270. DC heating elements 222, 223, and 224 are shown connected on one side to a common power and on the other side to different contact points of a multiple pole switch 290. The switch may be of sliding or rotary type. Switches 270 and 290 may be incorporated in the same switch so that for example in the first position (other than OFF where all contacts are open) only the AC element 111 is energized. In the second position both 111 and 222 are energized. In the third position 111, 222, and 223 are energized. In the fourth position all elements are energized.

The alternative as suggested above is that all DC elements are connected simultaneously but current flow to the elements is regulated using an infinitely variable control such as a variable resistance rheostat or similarly adjustable current or voltage limiting device. In fact, one could use circuits using high power semi-conductor devices to regulate current flow. Examples would include circuits using a silicon controlled rectifier or a pulse width modulation type circuit. With the addition of timing circuitry, one could automatically provide an initial fast warm-up stage to sear the meat to seal in the juices followed by a slower cooking phase. It is also apparent that an initial high heat stage can be accomplished manually by flipping the switch 290 to different positions.

Also shown in FIG. 5 is a battery 20 (which may in fact be multiple batteries connected in series) and a battery charger 30. In the preferred embodiment, battery charger 30 provides a charging rate appropriate for the type of battery (lead-acid in this instance); namely, a relatively slow charge initially followed by an automatic float charge to maintain full charge without overcharging.

Battery charger 30 circuits may be supplemented to indicate the level of discharge reached during operation and to automatically cut off the heater operation is the discharge depth is out of the normal performance range for batteries used. Such detection and cut-off circuits are known and available in the trade.

The grill heating elements are designed to fit into a grill opening similar to existing large grills. In a preferred embodiment the grill size is 21.5 inches long by 10.5 inches wide providing 225 square inches of cooking/grilling surface. In this instance the combined 3600 watt elements will provide 12,283 BTUs or 55 BTUs per square inch. This is approximately the same amount of heat provided by some gas grills. Alternatively, for a more popular sized 300 square inch grill, the same 3600 watt elements would provide 41 BTUs per square inch.

A portable cordless variation of the grill described above is also possible. The benefit of this would be the greater flexibility in locating the grill during actual cooking or warming. Extension cords would not be required during cooking. In this instance additional batteries may be used to provide comparable power during an equivalent cooking period. A power cord and battery charger would be provided for re-charging purposes even though it may be disconnected during actual use for cooking. Heating elements of the DC type would be sized accordingly to obtain the additional power. Switching may be simplified when using only one power source, although the addition of a variable current or voltage controller that regulates heat level may be desired. Such a controller could be integrated into the on-off switch. Other aspects of the device would remain the same.

Appropriate selection of materials for the components in the various forms described is an important part of the functionality of the invention. Among the important interdependent choices are: battery size and rating, charging circuit, low battery sensing circuit and heating elements, voltage, amperage and wattage, electrical wiring sizing, heat and electrical insulating barriers, safety interlocks, support frame sizing and specifications.

Accordingly, the present invention has been described with some degree of particularity directed to preferred embodiments of the present invention. It should be appreciated, though, that the present invention is defined by the following claims construed in light of the prior art so that modifications or changes may be made to preferred embodiments of the present invention without departing from inventive concepts contained herein.

I claim:

1. A high heat electric powered grill comprising:
   a frame having a housing;
   a means for connecting to an AC circuit;
   at least one AC powered electrical heating element;
   at least one DC powered electrical heating element;
   at least one storage battery; and
   a charging circuit.

2. The grill of claim 1 wherein said charging circuit converts 120 V AC into between 12 and 48 V DC.

3. The grill of claim 2 further comprising a means for preventing over-charging of said at least one storage battery.

4. The grill of claim 3 wherein said means for preventing overcharging comprises a specific voltage cut-off diode.

5. The grill of claim 1 further comprising a means for preventing excess discharging of said at least one battery.

6. The grill of claim 5 wherein said means for preventing excess discharging comprises means for automatically shutting off said grill if low battery voltage is sensed.

7. The grill of claim 1 wherein said frame provides support holding a food rack upon which food is placed for grilling said rack being positionable to within 1.2 cm of said heating element.

8. The grill of claim 1 wherein said housing comprises separate areas for cooking and for holding batteries and a battery charger along with associated circuitry.

9. The grill of claim 1 further comprising independent controls for AC and DC heating elements.

10. The grill of claim 1 further comprising means for adjusting the amount of heat from AC and DC heating elements.

11. The grill of claim 1 wherein said AC powered heating element is rated at up to 1800 watts.

12. The grill of claim 1 wherein said DC powered heating elements are collectively rated at up to 35,000 watts.

13. The grill of claim 1 wherein said DC powered electrical heating elements are low DC voltage units between 12 and 48 volts each.

14. The grill of claim 1 further comprising a means for switching power, wherein said means for switching power comprises a high current contactor actuated by a coil to switch power on and off.

15. The grill of claim 1 further comprising at least one high current capacity bus bar to carry current from said at least one storage battery to said at least one DC powered electrical heating element.

16. The grill of claim 1 further comprising a battery support in said housing below said at least one AC powered electrical heating element and said at least one DC powered electrical heating element, so weight from said at least one battery lowers the center of gravity of said grill and maximum separation of the batteries from grill heat is provided.

17. The grill of claim 10 wherein said means for adjusting the amount of heat from AC and DC heating elements is a multiple pole switch so that different heating elements may be combined to provide a range of heat intensity.

18. The grill of claim 10 wherein said means for adjusting the amount of heat from AC and DC heating elements is at least one variable resistance rheostat.

19. The grill of claim 10 wherein said means for adjusting the amount of heat from AC and DC heating elements is a circuit using at least one semi-conductor device.

* * * * *